United States Patent

[11] 3,596,939

[72] Inventor Glenn J. Gibson
 97 Beech Ave., Berkeley Heights, N.J. 07922
[21] Appl. No. 752,842
[22] Filed Aug. 15, 1968
[45] Patented Aug. 3, 1971

[54] TUBE JOINT HAVING SEALING AND CRIMPING MEANS
3 Claims, 8 Drawing Figs.

[52] U.S. Cl............................................. 285/382.2,
 29/516, 285/156, 285/179, 285/369
[51] Int. Cl........................................... F16l 13/14
[50] Field of Search.................................. 285/382.2,
 382.1, 369, 382; 29/516

[56] References Cited
UNITED STATES PATENTS
| | | | |
|---|---|---|---|
| 2,270,926 | 1/1942 | Briegel et al. | 285/382.2 |
| 2,702,716 | 2/1955 | Basolo et al. | 285/369 X |
| 2,738,992 | 3/1956 | Heisler | 285/369 X |
| 2,821,415 | 1/1958 | Race | 285/382.4 X |
| 3,068,563 | 12/1962 | Reverman | 285/382.2 X |
| 3,149,861 | 9/1964 | Larsson | 285/382.2 X |
| 3,244,441 | 4/1966 | Caudle | 285/382 X |
| 3,343,252 | 9/1967 | Reesor | 285/382.2 X |
| 3,425,452 | 2/1969 | Shaw | 285/382.2 X |

Primary Examiner—Thomas F. Callaghan
Attorney—Charles E. Graves

ABSTRACT: An apparatus is disclosed for simplified joining of sections of metallic tubing, especially stainless steel tubing. A thin-walled fitting made from tubular stock is described which in one form involves a single O-ring seated in a formed annulus, and a ridgelike stop adjacent to the annulus. The inside diameter of the fitting provides a small clearance with the tube to be joined. The tube section is inserted into the fitting by hand, compressing the O-ring to form the seal. The tube section abuts the stop, and in this position the joint is locked as by crimping the fitting sleeve so that it engages the tube section.

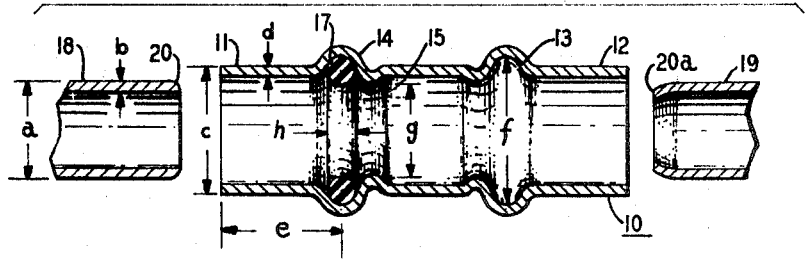
FIG. 1
FIG. 4
EXEMPLARY DIMENSIONAL RANGES FOR 1/2" O D STAINLESS STEEL TUBING JOINT
| DIMENSION | LOW | HIGH |
| --- | --- | --- |
| a | .497 | .503 |
| b | .015 | .025 |
| c | .547 | .553 |
| d | .010 | .030 |
| e | 1/2 | 3/4 |
| f | .590 | .610 |
| g | .489 | .495 |
| h | .067 | .073 |
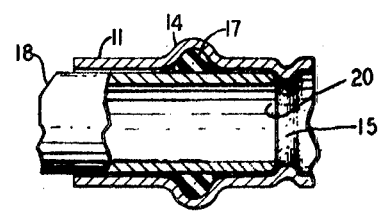
FIG. 2
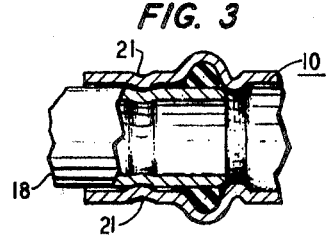
FIG. 3
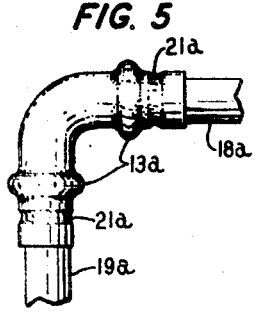
FIG. 5
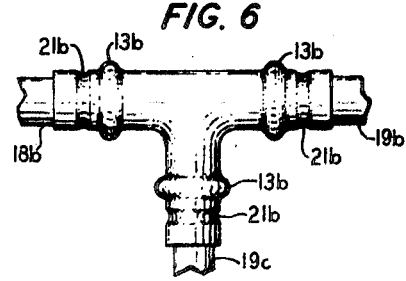
FIG. 6
INVENTOR
GLENN J. GIBSON

TUBE JOINT HAVING SEALING AND CRIMPING MEANS

FIELD OF THE INVENTION

This invention concerns a method for joining of sections of metallic tubing. In one aspect, the invention concerns a method and structure for joining of stainless steel tubing by means of thin-walled fittings in which the joint requires no threads, solder, cements, or welds. The invention includes a method for fabricating the fittings.

BACKGROUND OF THE INVENTION

A variety of types of fittings are used today for the joining of sections of metallic tubing. The fitting types variously rely upon threaded, welded, soldered, cemented or other conventional joints. The cost and ease of use of the fitting depends on the joint type and the tubing application. Soldered copper joints are an example of a reasonably low-cost and simple expedient; and threaded swage-type fittings for stainless steel tubing exemplify a fairly high cost item. The fitting art currently lacks a low-cost and simple method of joining sections of thin-walled stainless steel tubing; and this lack has been one factor inhibiting the broader commercial use of such tubing. The point is illustrated by reference to the tubing methods which for years have prevailed in home water systems.

For many years, copper tubing has been used in home water systems because of its durability, small size, resistance to corrosion and the relative ease with which the soldered joints can be effected. Originally, copper tubing replaced iron piping which had the drawbacks of requiring threaded fittings and heavy wall thicknesses as well as large diameters. Today, however, copper tubing is no longer as attractive a choice for domestic water systems as earlier. One reason, of course, is the uncertainty of an adequate and continuing copper supply. Another reason relates to the emergence of stainless steel tubing as an economically attractive alternative to copper tubing.

While still regarded as a specialty item, stainless steel tubing now compares favorably to copper tubing in cost as well as characteristics. Stainless steel tubing weighs only about one-half as much as copper tubing would for the same service requirement. The weight saving stems from the fact that the tensile strength and yield point of stainless steel is about three times higher than copper, and makes for much easier handling in piping systems installation. Moreover, stainless steel tubing is almost completely resistant to corrosive substances often found in home water supplies. Today the cost of stainless steel tubing per foot is actually less than that of copper.

The major drawback to the use of stainless steel tubing in home water systems is the lack of a low-cost, reliable and simple method for joining the tube sections. Such a system normally is composed of straight tubes connected by fittings wherever a change of direction or a branch is required. The fittings typically are elbows and "T" or "Y" shapes where a branch is required. Other fitting types include reducers, caps, crosses, and adapters to other types of fittings.

By definition, each fitting has at least one joint which is the pressure and mechanical seal between fitting and tube. Copper piping uses fittings with socket ends for soldered joints; and these are not difficult to effect. Stainless steel tubing, on the other hand, is extremely difficult to solder. The existing alternatives to joining stainless steel tubing by solder joints all have disadvantages, however. Threaded, mechanical, compressive or flute-type fittings are precision made and hence too costly for widespread use, especially in home water systems. Welded joints in the thin-walled stainless steel tubing contemplated for such use require a high degree of skill to effect. The cemented-type joints available today require an expensive socket fitting and are not self-supporting while the cement is setting.

Accordingly, one object of the invention is to reduce the cost and complexity of thin-walled metallic tube joints.

Another object of the invention is to eliminate the need for threads, solder, welds and the like in thin-walled stainless steel tubing fittings.

A specific object of the invention is to realize a method for joining thin-walled metallic tubes that requires only the most minimal mechanical aptitude.

A particular and important object of the invention is to provide a reliable, low-cost alternative to the use of copper tubing in domestic water systems.

A further object of the invention is to inexpensively join sections of stainless steel tubing in a domestic water system.

A further object of the invention is to produce an inexpensive thin-walled fitting which can be used to realize the above objects.

SUMMARY OF THE INVENTION

The invention in one form contemplates the joining of the various sections of a metallic tubing system as, for example, domestic water systems, with the use of fittings characterized broadly by an O-ring disposed in a gland formed internally in the fitting; and a mechanical joining of fitting and tube effected by inserting the tube into the fitting for a prescribed distance and then crimping the fitting sleeve into the tube surface.

More specifically, the fitting is made from thin-walled tubular stock with an inside diameter size that provides a close clearance fit over the outside diameter of the tubes to be connected. Approximately one diameter length from the respective ends of the fitting, a full annular groove or channel is formed in the fitting tube stock wall. This channel provides a gland for seating an annular ring of circular cross section, i.e., an O-ring, which advantageously is made from a resilient material such as rubber. Immediately following the gland, a depending bead is formed which projects inwardly enough to act as a convenient stop for the inserted tube section. An effective fitting can be made, however, without the use of a stop.

The tube to be connected, advantageously is given a slight end bevel which, for example, is achieved naturally by the action of tube cutters. Then the tube is inserted into the joint and past the O-ring until it contacts the stop, if a stop has been provided. Pursuant to the invention, the overlapping portions of tube and fitting then are crimped to lock them together.

Tube fittings in which this invention finds preferred embodiment may be formed, for example, as two-jointed straight couplings, two-jointed elbows, three-jointed T's or Y's, or one-jointed caps. In all cases, the joint structure can be the same and, since the fittings come equipped with O-ring in place, the installation involves merely inserting the tube into the fitting and mechanically crimping the overlapped sections. This can be achieved with a simple hand tool.

The basic joint described above is preferred in achieving the object of low-cost and reliable joining of tube sections for the further reason that, pursuant to another facet of the invention, the joint can be formed quite simply. The process involves a beading operation on a lathe wherein, in one step, both the gland and the stop are formed.

In its broadest aspect, the present invention constitutes a more economical method of joining stainless steel tubing in such current applications as chemical piping, beverage and food uses, the lower pressure hydraulic systems as well as in domestic water systems. Additionally, the inventive fittings are also vacuumtight and accordingly suited to vacuum applications. Their low cost and ease of making, added to the foregoing, makes the fittings especially attractive for temporary laboratory experimental fluid or vacuum systems.

The fitting and joint structure, their method of manufacture and their method of use may be fully apprehended from a reading of the descriptions now to be presented of illustrative embodiments taken in conjunction with the drawing, in which FIG. 1 is a sectional side view of a straight fitting and tubing to be joined thereby;

FIG. 2 is a sectional side view illustrating the joint structure;

FIG. 3 shows in sectional view the joint of FIG. 2 with a crimp;

FIG. 4 is a table illustrating dimensional ranges useful in practicing the invention;

FIGS. 5 and 6 are perspective views of two further fitting shapes; and

ILLUSTRATIVE EMBODIMENTS OF THE INVENTION

Figure 7:
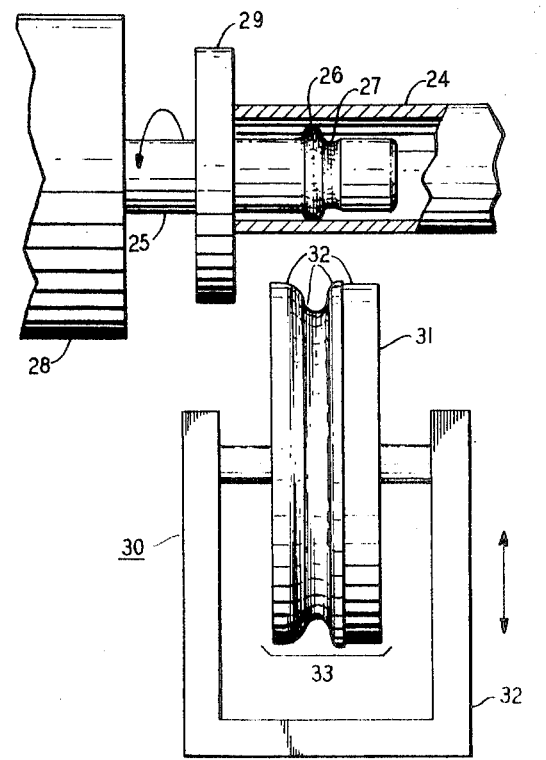
FIGS. 7 and 8 are schematic diagrams showing a preferred method of forming the fittings.

FIG. 1 shows the basic joint structure embodied in a metallic fitting of the straight coupling-type, designated 10. Fitting 10, if intended to receive tubes of a nominal ½-inch outside diameter, has an inside diameter slightly more than one-half inch—enough to allow a snug all-around clearance between tube and fitting of about 0.005 inch. Fitting 10 consists of two end or sleeve portions 11, 12, and two outwardly extending annular glands 13, 14. The interior of each gland constitutes an internally facing annular recess. Adjacent to the glands 13, 14 are depending beads or projections 15, 16 which prevent insertion of the tube more than a predetermined distance beyond an O-ring seal 17, described below.

The projections 15, 16 must be located sufficiently far from the O-ring to permit its full compression before stopping insertion of the tube; and normally be not more than three tube diameters from the end of the fitting sleeve. Projections 15, 16 advantageously are directly adjacent the glands 13, 14, as depicted in FIG. 1, where the slope of the glands is continued as the slope of the projection shown there as an annulus. It may be desirable on occasion to locate the projections 15, 16 a small distance beyond the termination of glands 13, 14, however, as illustrated in FIG. 2.

The glands contain O-rings 17, as shown in FIG. 1, which are preinserted into each of the glands 13, 14. The O-rings 17 are made of a compliant material, for example, neoprene rubber. When in place in an uncompressed state, the inner diameter of O-ring 17 extends beyond the interior surface of fitting 10, preferably by at least 0.010 inches.

The tubes, designated 18, 19, to be inserted in fitting 10 are beveled or tapered at their ends. A taper can be achieved with a rolling blade tube cutter which is a conventional tool in the art. The end 20 of tube 19 illustrates the desired taper. A bevel can be achieved naturally with a lever-type tube cutter; or, if the tube 18 is cut off square, its end 20 can be given a bevel in a separate operation. End 20 of tube 18 in FIG. 1 shows such an end bevel. A bevel or taper, or combination thereof, has been found highly desirable in practicing the invention by facilitating insertion of the tube into the fitting 10 without disturbing the seating of the O-ring.

Tubes 18, 19 are inserted into fitting 10, hand pressure being sufficient. The tapered or beveled ends 20 readily slip by O-ring 17, compressing it pursuant to the invention to between 60 percent and 80 percent of its original cross-sectional diameter. The ends 20 come to rest against projections 15, 16. At this point, the desired hermetic pressure seal is achieved.

The friction of the O-ring 17 alone is not sufficient to prevent the internal tube pressure from ultimately causing the joint to separate and the fitting 10 to be forced off the tube. Accordingly, the fitting 10 and the tubes 18, 19 are mechanically joined as by the crimping step illustrated in FIG. 3. The crimp form shown in FIG. 3 is a single circular crimp 21, which, advantageously, can be applied by a conventional hand-operated tube-cutting tool the cutting edge of which has been dulled to a width of about one thirty-second inches. A typical depth of crimp is about 0.010 inches into the sleeve of fitting 10. The crimp produces a complementary deformation in the surface of tube 18, namely an indentation of about 0.005 inches.

This seemingly slight and simple-to-apply mechanical joinder of the fitting and the tube has netted surprisingly strong tubing systems. Tests conducted on a fitting such as depicted in FIG. 1 and which had but one circular crimp, showed the structure to consistently withstand air pressures of at least 1,950 p.s.i. before joint failure. Also, leakage tests conducted at 1,000 p.s.i. with water on a complex of inservice joints constructed pursuant to the invention, indicated complete integrity.

FIG. 4 tabularizes certain critical dimensions within which a typical embodiment of the invention is held for optimum results. Usually, the fitting wall thickness, $d$ is 0.020 inches, but it is understood that, in general, the thin-walled metallic fitting contemplated by the present invention has a wall thickness of from 0.010 to 0.045 inches, depending on the material and the application. The wall thickness does not vary along the length of the fitting, despite the forming and crimping.

More than one all-around crimp can be placed on the sleeve of fitting 10. Tests were conducted on a structure such as shown in FIG. 4 which was given two such crimps about three-sixteenth inches apart. The joints withstood a pressure of 2,200 p.s.i. before parting. It is important to bear in mind that strengths of this magnitude are of the order of 20 times the maximum pressure ever likely to be encountered in domestic water supply systems.

The crimps need not be circular in shape. One alternative is a pattern of dimples which penetrate to the 0.010 inches depth of crimp 21. When an especially sturdy mechanical joining is called for, the dimples can be driven deep enough to cause their peaks to break through as a jagged, gripping finger. Such a crimp is potentially useful on relatively thick-walled tubing sections, or on especially hard tubing surfaces. When dimpling patterns are used, as with all other crimps, it is desirable to keep the pattern symmetrical with respect to the tube axis. Breakthrough dimple crimps, of course, do not compromise the system pressure, since the crimps are applied outwardly of the O-ring seal.

Where desirable, joinder of fitting 10 and tubes 18, 19 can be achieved or augmented with a coating of cement such as epoxy resin. A still further means of preventing the tube section and fitting from separating involves the use of a toggle lock of the type disclosed in U.S. Pat. No. 2,819,733 which, to the extent relevant is hereby incorporated by reference into this application.

The length of the fitting sleeve, such as 11, between the O-ring gland and the fitting end is determined by two considerations. There must be enough space for the crimp to be placed without disturbing the gland or the O-ring. There also must be enough sleeve length to provide the fitting with rigidity so that it does not bend in use and in that way disturb the seal. Usually, a length of at least about one-fourth inch is required for crimping. A sleeve length equal to about one sleeve diameter normally suffices for bending resistance.

Bending resistance can also be provided by the fitting body on the far side of the gland, if a parallel relationship exists there between the fitting and the tube before the latter contacts the stop. This is illustrated in FIG. 2. In this embodiment, the crimp can be placed on the sleeve section to either side of the gland, or on both sides.

The fitting of FIG. 1 has a nominal inside diameter greater throughout than the outside diameter of the inserted tube. However, the fitting and tube can have the same nominal diameters and the fitting sleeve made by expanding it enough to allow tube insertion. The stop after the gland is provided as the tube is inserted into the expanded sleeve and beyond the gland into contact with the nominal inside diameter of the fitting.

Thus in the last embodiment, in terms of the dimensions of FIG. 1, the nominal diameter of fitting 10 is the same as the tube diameter $a$. The fitting sleeve 11 is expanded to an outside diameter $c$. The nominal inside diameter of the fitting is $g$. It is seen that the dimensions $g$ plus $d$ equal $a$ in this embodiment.

The lever-type tube crimpers earlier referred to are adaptations of the familiar lever action bolt cutter, except with the cutting edge modified into a circular shape slightly less in diameter than that of the tube to be cut.

FIGS. 5 and 6 depict other forms of fittings which exemplify the applicability of the inventive tube-fitting structure to all species of fitting shapes. FIG. 5 is a standard 90° elbow, with two O-iring glands 13a and the circular crimps 21a forming the basic joint with tube sections 18a, 19a. FIG. 6 is a T-fitting with three joints constructed according to the invention and including three glands 13b, crimps 21b, and the tube sections 18b, 19b, 19c. Other fitting forms, such as noted earlier, can be realized by the invention also.

Other variations upon the basic joint involve the use of more than one O-ring and, accordingly, more than one gland per joint. Two O-rings could be useful in high-pressure systems, but their use in domestic water systems is not envisioned. The material of which the O-rings are made would be dictated by the corrosive nature of the liquid in the tubing system. A rubber such as neoprene is suitable for water systems. Other materials such as MYLAR, polyethylene, Teflon, silicone, and Buna S are suitable for the present invention whenever required.

Throughout the foregoing, the thin-wall character of the inventive fitting has been emphasized; thick-walled tube stock, which in stainless steel for example would be one-sixteenth inch wall thickness, does not readily lend itself to forming of the fittings described above, at least in the manner contemplated by one facet of the invention. The thin-wall preference applies principally to the fitting, however, and not to the tubing to be joined thereby. If the latter is relatively thick, special crimping procedures such as the dimpling noted above, will effect a fully adequate mechanical joining—augmented, if necessary by cement. The thin-wall preference with respect to the fittings involves wall thicknesses for stainless steel of from 0.010 inches to 0.035 inches, and for aluminum or brass of from about 0.020 to 0.045 inches.

Another factor by which to gauge the applicability of the invention to a particular tube size from which it is desired to construct the fittings, is the ratio of tube diameter to wall thickness. In general, the range of such ratios within which the invention may be practiced when using stainless steel is from 20 to 40. For tube diameters of three-eighths to three-fourths inches the ratio is in the range of 20 to 30. For tube diameters above three-fourths inches, the ratio is 35 to 40.

Figure 8:
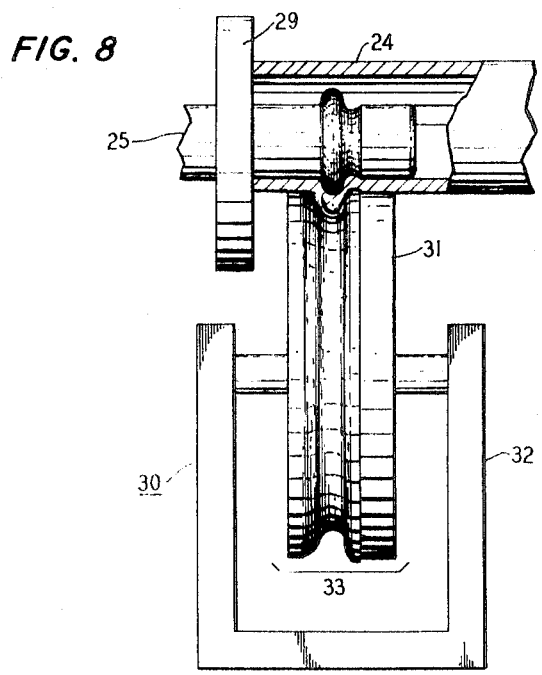

FIGS. 7 and 8 depict a preferred method for achieving the fitting shown, for example, in FIG. 1. A machined shaft 25 includes an annular bead 26 the cross section of which is the desired shape for the O-ring gland 13. The diameter of bead 26 is less than the nominal inside diameter of the tubing 24 from which the fitting is to be made. Adjacent to the bead 26, a depression 27 is provided to a depth equal to the desired inward protrusion of the projection 15. The tubing 24 is placed over shaft 25 and the bead 26, and is supported at its other end upon a spindle (not shown). The shaft is placed in a bench chuck 28, the tube contacting a face plate 29 associated with shaft 25. The chuck is turned at about 500 r.p.m.

A beading head 30 is moved into contact with the tube 24. Head 30 consists of a rotatable disc 31 mounted on a yoke 32 which can move at right angles to shaft 25. Disc 31 is contoured on its outside diameters 33 so as to fit all of the contours of the shaft 25 and to allow for lateral clearance of the wall thickness of the tube 24. When the shaft 25 contours and the mating contours of disc 31 contact with the tube 24 wall, as shown in FIG. 8, the O-ring gland and the stop are completely formed to the desired size.

Identical forming operations on the other end of the tube 24 can then be undertaken upon withdrawal of the tube from the shaft 25.

What I claim is:

1. In combination: a length of thin-walled metallic tubing and a thin-walled fitting overlying the end of said tubing, said fitting comprising an internally facing annular recess integrally formed in the wall thereof at least one fitting diameter removed from the end of said fitting overlying said tubing, a resilient O-ring in said recess encircling said tubing and radially compressed by virtue of insertion of said tube into said fitting to between 60 percent and 80 percent of its original cross-sectional diameter to form a hermetic seal between said tubing and said fitting, said tubing end having an outside diameter reduced sufficiently to permit insertion past said O-ring, an inward projection in said fitting, said projection being contacted by said tubing end and being located sufficiently far from said recess to permit full compression of said O-ring before said contact occurs, said projection being not more than three tubing diameters distant from said tubing end, and a complementary deformation of said fitting and said tubing along their overlapping portions applied after said full compression of said O-ring and a sufficient axial distance from said recess so as not to deform or disturb said recess or said O-ring, said deformation preventing longitudinal displacement of said fitting with respect to said tubing.

2. The combination of claim 1, wherein said complementary deformation comprises at least one circular crimp having an indentation upon said fitting of about 0.010 inches, resulting in a circular depression of the exterior of said tubing thereunder of about 0.005 inches.

3. The combination of claim 1, wherein said deformation comprises a plurality of dimple indentations applied to said fitting and impinging upon and deforming said tubing outer surface.